Aug. 30, 1932.    J. J. SENGLAR    1,875,268
ANTISKID CHAIN
Filed March 30, 1931
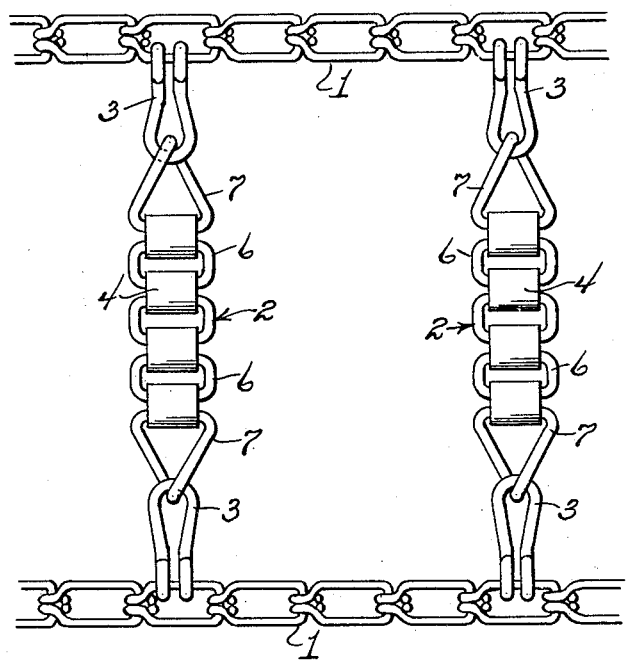
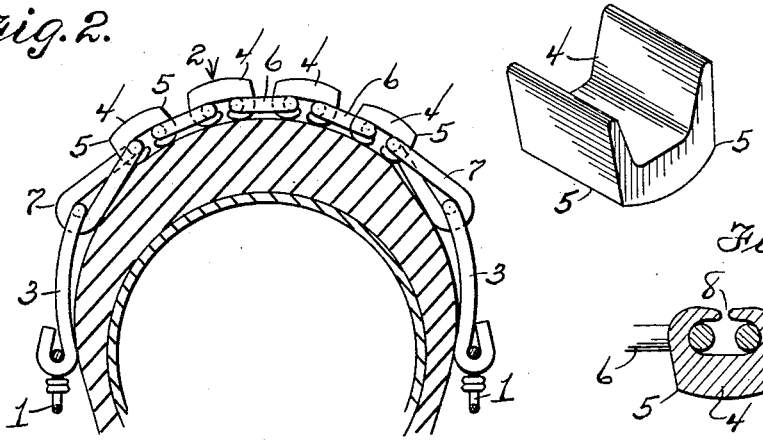
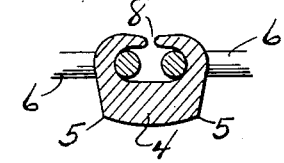
John J. Senglar
INVENTOR
BY Victor J. Evans
and Co.
ATTORNEYS Patented Aug. 30, 1932

1,875,268

UNITED STATES PATENT OFFICE

JOHN J. SENGLAR, OF TALLMADGE, OHIO

ANTISKID CHAIN

Application filed March 30, 1931. Serial No. 526,498.

This invention relates to anti-skid chains, and its general object is to provide a cross chain for anti-skid chains that includes ground engaging blocks having edges adapted to grip the roadway and thereby prevent slipping and longitudinal and lateral skidding, and the edges of the blocks retain their sharpness regardless of wear and until the chain becomes useless.

A further object of the invention is to provide an anti-skid chain that is possessed of long life, will not injure a tire, is simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a fragmentary view illustrating a section of an anti-skid chain and illustrates cross chains constructed in accordance with my invention.

Figure 2 is a transverse sectional view taken through a tire and showing the application of my cross chain thereto.

Figure 3 is a perspective view illustrating one of the blocks of my chain prior to it being bent in operative position.

Figure 4 is a sectional view taken transversely through one of the blocks and showin the same in applied position.

Referring to the drawing in detail, the reference numeral 1 indicates the side chains of an anti-skid chain and which are constructed in the usual manner, while the reference numeral 2 indicates my cross chain which includes end links 3 secured to parallel links of the side chains.

The primary feature of my cross chain is in fact the blocks 4 which as best shown in Figure 4 include a relatively thick body having a rounded outer surface that is engageable with the ground when the chain is applied to the tire, as will be apparent, and the rounded ground engaging surface of the blocks merge into the beveled side walls thereof in a manner to provide what may be termed gripping edges indicated by the reference numeral 5. These edges are relatively sharp and will remain accordingly throughout the life of the block regardless of wear upon the latter.

In Figure 3, I have disclosed one of the blocks prior to the side walls being curved upon themselves, and these blocks may be formed in any well known manner but are preferably provided from hot rolled steel bars shaped in accordance with the cross sectional shape of the blocks, and these bars are cut or sheared to the proper lengths to provide the blocks which are then associated with the intermediate links 6 and the substantially V-shape links 7 as shown in Figure 1. The blocks and links may then be put into a press for arranging the side walls about the links 5 and 6 to form the side chain as clearly shown in Figure 1.

The intermediate links 6 are substantially oval shape and while any number of these links may be employed, it depending upon the length of the cross chains, the blocks are of a size to prevent these links as well as the links 6 from contacting the ground, with the result the rounded outer surface of the blocks are subjected to all the wear, and as the body portion of these blocks is relatively thick, it will be apparent that the cross chains will be possessed of long life and will last for an indefinite period of time, as well as being extremely efficient in operation and service during that time.

Furthermore when the blocks become extremely worn and are ready to break from being worn down thinly, on the ground engaging face, they may be easily replaced by new blocks. This is done by forcing the old blocks apart with a wedge at the opening numbered 8 in Figure 4 then a new block inserted and again associated with the oval or end links as the case may be, and clinching side wall of the block over the connecting links. By this method the entire cross chain does not have to be replaced but only the wearing blocks.

From the above description and disclosure of the drawing, it will be obvious that I have provided a cross chain for anti-skid chains, that includes a ground engaging block having gripping edges that will be retained in a sharpened condition during wear thereon, and until the cross chain is worn to an extent that it becomes useless.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

An anti-skid chain comprising side chains, cross chains including end links secured to opposite links of the side chains, blocks included in the cross chains and being provided with tapered side walls and relatively thick bodies having rounded outer surfaces merging into the side walls to provide relatively sharp ground gripping edges, links connecting the blocks together and receiving the side walls, and the latter being curved about said last mentioned links in a manner whereby the ends of said side walls of each body are disposed parallel therewith and in alignment with each other.

In testimony whereof I affix my signature.

JOHN J. SENGLAR.